(12) United States Patent
Sims et al.

(10) Patent No.: US 11,941,705 B2
(45) Date of Patent: Mar. 26, 2024

(54) SYSTEM AND METHOD FOR EMBEDDING A DATA ANALYTICS SYSTEM IN A THIRD PARTY NATIVE ENVIRONMENT

(71) Applicant: KPMG LLP, New York, NY (US)

(72) Inventors: Brian Lee Sims, League City, TX (US); Mark Anthony Joelson, San Diego, CA (US); Erin Elizabeth Kretman, Huntington Woods, MI (US); Hunter Troy Henley, Lucas, TX (US); Stephen P. Kosky, III, Cincinnati, OH (US)

(73) Assignee: KPMG LLP, New York, NY (US)

( * ) Notice: Subject to any disclaimer, the term of this patent is extended or adjusted under 35 U.S.C. 154(b) by 586 days.

(21) Appl. No.: 16/878,402

(22) Filed: May 19, 2020

(65) Prior Publication Data
US 2021/0366054 A1    Nov. 25, 2021

(51) Int. Cl.
*G06Q 40/12* (2023.01)
*G06F 16/27* (2019.01)
(Continued)

(52) U.S. Cl.
CPC ............. *G06Q 40/12* (2013.12); *G06F 16/27* (2019.01); *G06F 16/9035* (2019.01);
(Continued)

(58) Field of Classification Search
CPC .... G06Q 40/12; G06Q 10/10; G06Q 2220/10; G06Q 40/00; G06F 16/27; G06F 16/9035;
(Continued)

(56) References Cited

U.S. PATENT DOCUMENTS

| | | | |
|---|---|---|---|
| 7,774,271 B1 * | 8/2010 | Edwards ................ | G06Q 20/10 705/38 |
| 2003/0058084 A1 * | 3/2003 | O'Hara .................. | G07B 15/00 340/5.6 |

(Continued)

FOREIGN PATENT DOCUMENTS

CN          107766720 A   *   3/2018

OTHER PUBLICATIONS

International Search Report and Written Opinion, PCT/US2021/033095, dated Sep. 6, 2021, 14 pages.

*Primary Examiner* — Zeshan Qayyum
(74) *Attorney, Agent, or Firm* — Nelson Mullins Riley & Scarborough LLP; Anthony A. Laurentano

(57) ABSTRACT

A data processing and analytics system for processing financial related data includes a financial data processing unit that is secured by a security layer. The financial data processing unit and the security layer are embedded in a company native environment. The company has a plurality of data sources for providing raw financial data that is filtered by the security layer prior to transfer to the financial data processing unit. The financial data processing unit includes a raw data storage unit for storing the raw financial data, and a data processing unit for processing the raw financial data via one or more preloaded audit applications. The processed financial data is then employed to generate one or more financial reports that are then transferred to the financial expert externally of the company.

33 Claims, 6 Drawing Sheets

(51) Int. Cl.
*G06F 16/9035* (2019.01)
*G06F 21/60* (2013.01)
*G06F 21/62* (2013.01)
*G06Q 10/10* (2023.01)

(52) U.S. Cl.
CPC ........ *G06F 21/602* (2013.01); *G06F 21/6245* (2013.01); *G06Q 10/10* (2013.01); *G06F 2221/2101* (2013.01); *G06Q 2220/10* (2013.01)

(58) Field of Classification Search
CPC ............... G06F 21/602; G06F 21/6245; G06F 2221/2101
USPC .......................................................... 705/51
See application file for complete search history.

(56) References Cited

U.S. PATENT DOCUMENTS

| | | | |
|---|---|---|---|
| 2003/0141411 A1* | 7/2003 | Pandya | G06Q 10/02 244/114 R |
| 2005/0144096 A1 | 6/2005 | Caramanna et al. | |
| 2017/0069020 A1 | 3/2017 | Goyal et al. | |
| 2018/0225775 A1* | 8/2018 | Pan | G06Q 10/06 |
| 2020/0013036 A1* | 1/2020 | Griffith | G06Q 20/327 |
| 2020/0226899 A1* | 7/2020 | Grunwald | G06K 19/06037 |
| 2020/0250157 A1* | 8/2020 | Gendelev | G06F 16/211 |

\* cited by examiner

SYSTEM AND METHOD FOR EMBEDDING A DATA ANALYTICS SYSTEM IN A THIRD PARTY NATIVE ENVIRONMENT

BACKGROUND OF THE INVENTION

The present invention is related to systems and methods for processing financial related information, and more specifically is related to systems and methods for aggregating and processing financial related information within a company environment.

In order to comply with current tax and finance related laws, companies need to file selected documents with the government at selected times during the year. Many companies, especially large companies, work with or engage external tax and audit finance experts to handle the processing of financial related data from the company and to prepare and file the various, necessary filings with the local, state and federal governments and agencies. With regard to large companies, the internal collation, handling, and processing of financial related data can be a monumental task. As such, companies expend significant resources tracking and collating this data. Further, large companies oftentimes have many different disparate systems at different locations, all of which are generating financial related information.

Conventional systems exist that allow the companies to collate and store the financial related information, including for example enterprise resource planning (ERP) systems. The companies typically deploy the ERP systems at many different locations to aggregate and store financial related information that are eventually needed by the external financial experts. The large company needs to work closely with the external financial experts to allow them access to all of the various ERP systems and the financial data stored therein. Conventionally, the financial data is downloaded or transferred from each of the ERP systems to the external finance expert.

A drawback of this conventional approach is that many different, disparate ERP systems at the company need to be located, and company staff needs to confirm that all of the necessary finance data is stored therein for subsequent transfer to the finance expert. Also, the amount of data that is transferred is quite large and is resource and time intensive. Further, since important company finance related data is being exported to the financial expert and hence external to the company, the company tends to be quite concerned about the security and confidentiality with which the data is being handled.

SUMMARY OF THE INVENTION

The present invention is directed to the ability for a party, such as a financial expert, to create a financial data processing and analytics system within the native environment of a third party, such as a company. The data processing and analytics system is protected or secured by a security layer that via a cryptographic technique. The data processing and analytics system is formed by dedicating a plurality of processing nodes of the company for use by the financial expert. The nodes form the processing and technical backbone of the data processing and analytics system. The data processing and analytics system includes a financial data processing unit that is secured by a security layer. The company has a plurality of data sources for providing raw financial data that is filtered by the security layer prior to transfer to the financial data processing unit. The financial data processing unit includes a raw data storage unit for storing the raw financial data, and a data processing unit for processing the raw financial data via one or more preloaded audit applications. The processed financial data is then employed to generate one or more financial reports that are then transferred to the financial expert externally of the company.

The present invention is directed to a data processing system for processing and analyzing financial data, where the data processing system of a financial expert is contained and secured within a native environment of an enterprise. The system includes a financial data processing unit of the financial expert for processing and analyzing the financial data from one or more data sources, and a security layer of the financial expert for securing via an encryption technique the financial data processing unit within the native environment of the enterprise so as to restrict access thereto to the financial expert. The financial data processing unit includes a raw data storage unit for receiving and storing raw financial data from the one or more data sources, a data processing unit for processing the raw financial data and generating processed financial data, and a reporting unit for creating one or more financial reports from the processed financial data. The security layer of the financial expert includes a data filtering unit for filtering the raw financial data prior to receipt of the raw financial data by the raw financial data storage unit, an access control unit for controlling access along a communication channel to the financial data processing unit, and a connection monitoring trace recorder (CMTR) unit for monitoring connections to the financial data processing unit. The financial data processing unit and the security layer of the financial expert are embedded in the native environment of the enterprise.

The financial data processing unit and the security layer are formed from a plurality of nodes of the enterprise. Also, the raw financial data can be replicated from the one or more data sources, and the data sources can include one or more enterprise resource planning systems or one or more financial data storage units.

According to one practice, the security layer further comprises a report generator for generating a report providing of users of the financial data processing unit, and a password encryption unit for encrypting the processed financial data of the data processing unit. The financial data processing unit further comprises a storage unit for storing the one or more financial reports created by the reporting unit. The storage unit can be a database, and can further include an analytical processing engine associated with the database.

Further, the data processing unit can include one or more audit applications for processing the raw financial data, and wherein the audit applications are stored in a software container, where the audit application is stored therein in compiled executable binary files.

Still further, the data filter unit of the security layer defines one or more parameters for processing of the raw financial data, and the raw financial data is stored in the raw data storage unit in raw data tables, and wherein the data processing unit processes the raw financial data in the raw data tables and stores the processed financial data in an audit data structure. The raw data tables have a normalized structure for organizing the data elements in a disaggregated way, and the processed financial data is mapped to one or more data tables in the reporting unit so as to create the financial reports.

The present invention is also directed to a computer implemented method for processing and analyzing financial data with a data processing system, wherein the data processing system is contained and secured within a native environment of an enterprise. The method includes embedding a financial data processing unit of a financial expert in the native environment of the enterprise, receiving and storing raw financial data from one or more data sources of the enterprise in the financial data processing unit, processing the raw financial data and generating processed financial data with the financial data processing unit, and creating one or more financial reports from the processed financial data with the financial data processing unit. The method further includes securing via a security layer the financial data processing unit in the native environment of the enterprise via an encryption technique so as to restrict access thereto to the financial expert, thereby preventing access to the processed financial data by the enterprise, filtering the raw financial data prior to receipt of the raw financial data by the financial data processing unit, controlling access along a communication channel to the financial data processing unit, and monitoring connections to the financial data processing unit.

The method of the present invention can further include employing the encryption technique for securing the financial data processing unit, for limiting communication with the financial data processing unit, and for monitoring and controlling the flow of financial data to and from the financial data processing unit. Also, the method can include forming the financial data processing unit from a plurality of nodes of the enterprise, and replicating the raw financial data from the one or more data sources of the enterprise.

The method can also include one or more of generating a report of users of the financial data processing unit, password encrypting the processed financial data of the data processing unit, processing the raw financial data with one or more audit applications, and storing the audit application in a software container in compiled executable binary files. The step of filtering further comprises defining one or more parameters associated with the processing of the raw financial data.

The method of the invention can also include storing the raw financial data in the raw data storage unit in raw data tables, and processing the raw financial data in the raw data tables and then storing the processed financial data in an audit data structure. The raw data tables have a normalized structure for organizing the data elements in a disaggregated way. The method can also include one or more of mapping the processed financial data to one or more data tables in the reporting unit so as to create the financial reports, encapsulating the financial data processing unit with the security layer, and restricting access to the financial data processing unit with the security layer.

The method of the present invention can also include recording access to the financial data processing unit, tracing financial data to data tables in the financial data processing unit, and applying a password encryption technique to the processed financial data. Further, the method can include employing one or more electronic devices of the enterprise to access the financial reports, and via the financial expert, controlling access by to the electronic devices.

The method can further include transmitting the financial reports from the electronic devices of the enterprise to one or more electronic devices of the financial expert, and deleting the financial reports and associated files in the financial data processing unit.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Figure 1:
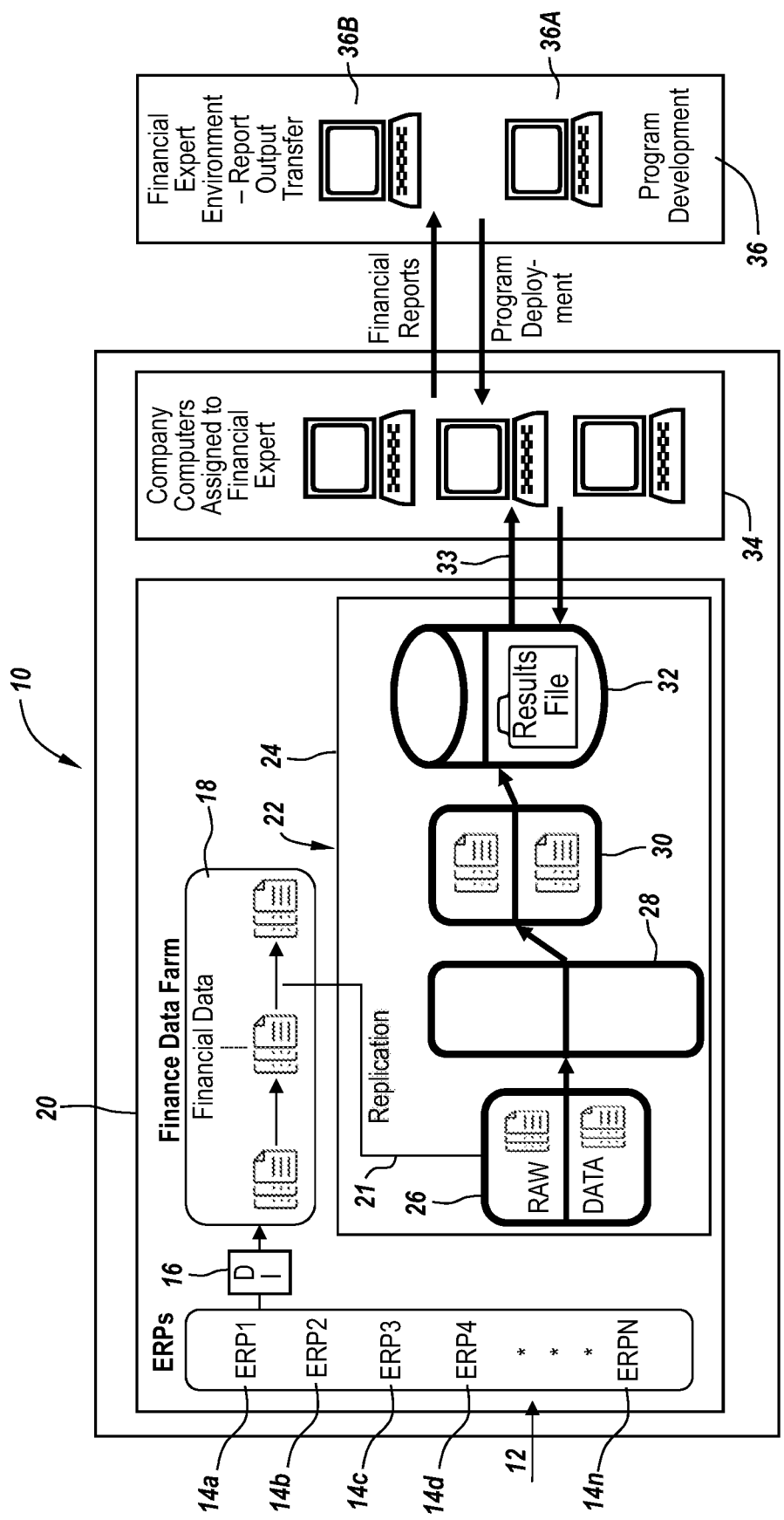
FIG. 1 is a schematic representation of the electronic data collection and processing system having a security layer and a financial data processing unit according to the teachings of the present invention.

As used herein the term "financial data" can include any data that is associated with or contains financial or financial related information. The financial information can include information that is presented free form or in tabular formats and is related to data associated with financial, monetary, or pecuniary interests. The financial information can also include operational data that is associated with the processing of the financial data by the system. The operational data can include for example engineering data, manufacturing process data, and the like.

As used herein, the term "enterprise" is intended to include a structure, facility, business, company, operation, organization, or entity of any size. Further, the term is intended to include an individual or group of individuals, or a device of any type.

As used herein, the term "financial data processing unit" or "financial data processing subsystem" is intended to include any unit implemented in hardware, software or a combination thereof that applies financial rules and models to data of any type, including financial data, so as create or generate one or more financial reports. The financial rules and modeling can include applying known and/or custom business concepts, accounting concepts, tax concepts, audit concepts, consulting concepts or advisory concepts.

As used herein, the term "financial reports" is intended to include any type of statement or report that exists in any suitable format (e.g., printed or in digital file format) that sets forth or includes financial data, including, for example, audit reports, audit evaluation results, financial analysis or evaluation results, and the like. The financial data and/or financial reports can be used to create or generate tax returns, income statements, cash flow statements, balance sheets, 10-K statements, 10-Q statements, annual reports, loan applications, credit history reports, invoices, and the like.

As used herein, the term "financial expert" is intended to include any enterprise that reviews, analyzes, and/or processes financial data, and generates one or more financial reports. The financial expert can also provide tax, accounting, auditing, consulting, and/or business related services. Examples of a suitable financial expert includes tax firms, accounting firms, auditing firms, or firms that perform a combination of services.

The present invention is directed to a system and method for placing or embedding data analytics applications via a financial data processing unit or subsystem in the native environment of a third party enterprise, such as a company, organization and the like. For purposes of simplicity, we use the term company herein. The company can be represented as an overall electronic data collection and processing system 10 that can house multiple different electronic devices at a single location or at multiple disparate locations, including portions of the system that can be cloud hosted. As used herein, the term "electronic device" can include servers, controllers, processors, computers, tablets, storage, databases, memory and the like. The illustrated electronic system 10 is merely illustrative and can be illustrated to house any selected number of electronic devices that communicate with each other. The electronic system 10 can include for example a series of enterprise resource planning (ERP) systems 14a-14n that can be housed in a single location or in multiple different locations, or can be cloud hosted, such as for example by using Amazon (e.g., AWS), Microsoft (e.g., Azure), or Google (e.g., Google cloud) cloud hosting services. The ERP systems 14a-14n can be implemented using any known electronic device employing conventional data analytics and processing applications, such as those from Oracle, Salesforce, SAP, ServiceMax and the like. Generally, the data analytics applications process data in a Common Data Model (CDM)(e.g., a standardized data structure), which harmonizes the data from all of the various data sources into a single data format. The ERP systems can include any selected type of data, including financial data in both structured (e.g., tables and reports), semi-structured, and unstructured (e.g., invoices, PDFs, and the like) forms. The financial data can be generated by one or more data sources in the form of source data 12 that communicates with the electronic system 10. The ERP systems 14a-14n can thus be employed to extract the financial data from the source data 12 that is subsequently used by a financial expert to generate one or more financial reports. As used herein, the term "source data" can include any type of data from any suitable source that would benefit from being converted into a more usable form. The source data can include, for example, financial related data. The source data can be in hard copy or written form, such as in printed documents, or can be in digital file formats, such as in portable document format (PDFs), word processing file formats such as WORD documents, as well as other file formats including hypertext markup language (HTML) file formats and the like. It is well known in the art that the hard copies can be digitized and the relevant data extracted therefrom.

The financial data from the ERP systems 14a-14n can then be optionally processed by a data integration unit 16 that employs any selected type of data integration software application to extract the financial data from the EPR systems 14a-14n, integrate the various types and forms of financial data, and then store the financial data in a financial data storage unit, farm or repository 18. The data integration application can also be employed if desired to change or transform the various types of data structures into a common data model structure. An example of a suitable data integration application is sold by Talend, Inc., USA. If desired, the system 10 can optionally employ any suitable data replication software (e.g., HVR software application) for replicating the financial data stored in the ERP systems 14a-14n or from other data sources into the financial data storage unit 18. The financial data storage unit 18 can be located within the company at one or more locations on one or more servers, in the cloud at one or more cloud hosting facilities, or a combination of both.

The illustrated ERP systems 14a-14n as well as the financial data storage unit 18 are secured in a secured area 20 forming a secured native environment. The secured area 20 can be implemented by software, hardware or a combination of both. The secured area 20 can employ known security techniques for securing the data. For example, the financial data can be secured using encryption, firewalls, data masking and the like.

The present invention also considers employing a financial data processing unit 22 and associated security layer 24 from a third party, such as from a financial expert, and placing the financial data processing unit 22 and security layer 24 in the native environment formed by the secured area 20 of the company. The financial data processing unit 22 and security layer can communicate with selected components of the company system, such as for example with the financial data storage unit 18. The security layer 24 can be employed to help secure the financial data processing unit 22 in the native environment. The security layer 24 and the financial data processing unit 22 can be implemented by a combination of hardware and software. For example, the security layer 24 can employ known encryption techniques for securing the financial data processing unit 22, for limiting communication and access thereto, and for monitoring and controlling the flow of financial data to and from the financial data processing unit. For example, the advanced encryption standard (AES) 256 type encryption can be used on the separate data tables stored in the financial data processing unit 22 as well as on the applications employed therein. A standard password mechanism for authentication with complexity features (e.g., failed attempts lockout, alpha-numeric/special character requirements, periodic change requirements), user role assignments to restrict by role, administrator trace deactivation, and schema role assignments to restrict data repository to appropriate roles and the like can also be employed. The security layer can also create user reports and the like so as to monitor access to the financial data processing unit 22. The financial data processing unit 22 can be configured so as to allow access by the financial expert and if desired by selected personnel of the company.

The illustrated financial data processing unit 22 can include a raw data storage unit 26 for storing therein raw data, such as raw financial data 21, transferred or replicated from the financial data storage unit 18. The financial data that is stored in the financial data storage unit 18 can be transferred from or replicated for subsequent storage in the storage unit 26. The financial data 21 in the financial data storage unit 18 can be in any form, such as for example structured, semi-structured, or unstructured. The raw financial data stored in the raw data storage unit 26 is then transferred to a data processing unit 28 for processing the data into a more structured format. For example, the data processing unit 28 can analyze, organize and if desired display the data, such as the financial data, in a desired format. The data processing unit can also locate and analyze specific types of financial data. The financial data processing unit 22 is separate and distinct from the company's overall system. The data can be in tabular form and/or placed in tables by employing suitable financial tools and applications, as is known in the art. Examples of the types of software applications that can be implemented in the processing unit 28 include but are not limited to software applications from Qlikview, Alteryx, PowerBI, Tableau, Python, R, and the like. According to one embodiment, one or more of the data processing applications can be stored or installed in compiled executable binary files directly in the data processing unit 28. The compiled executable is the file which stores the software code. The act of compiling the code converts the code from human readable language to machine language. The binary file format cannot be de-compiled. For procedures built in software that do not compile, encryption of those procedures is applied, such as for example, using an encryption algorithm such as the AES 256 encryption algorithm or technique.

The processed data is then transferred to the reporting unit 30 that collates and organizes the financial data and then creates or generates selected financial reports, such as audit or analysis reports. The financial reports are then stored in a report storage unit 32, such as a database. The reporting unit 30 and the report storage unit 32 can be separate elements, as shown, or can be combined into a single unit. The financial reports 33 from the financial data processing unit 22 can be displayed via suitable electronic devices resident on the company side, such as for example on the illustrated computers 34. The computers 34 on the company side are external to the security layer 24 of the third party, such as the financial expert, and external to the security layer 20 of the company. Thus, personnel of the financial expert, and if desired selected personnel of the company, can access the financial reports that are stored in the database 32. The computers 34 of the enterprise can also communicate with suitable electronic devices, such as computers 36, at the financial expert location as well as with the financial data processing unit 22. This enables the financial expert to access, store and further process the financial reports received from the financial data processing unit 22, as well as to provide data, application software, and/or instructions, via the computers 34 and 36. According to one practice, the computers 34 are disposed on the company side of the system and can have associated therewith selected security protocols for limiting access to the computers 34. For example, the security schema can be such that selected personnel of the financial expert can access the computers, and if desired, only limited personnel from the company, such as administrators. The computers 34 can interface with the computers 36 that are disposed external to the company, and preferably are controlled by the financial expert. Thus, the computers 36 can be disposed at a facility of the financial expert. The computers 36 can provide application software, data, and associated instructions that are conveyed to the computers 34. The information is in turn conveyed by the computers 34 to the financial data processing unit 22.

In the above electronic data collection and processing system 10, the financial data of the company is secured within the secured area or security layer 20 and the financial expert (i.e., third party) can process the financial data and generate financial reports while resident within the security layer 24. This functionality is achieved by creating and positioning the financial data processing unit 22 of the financial expert within the enterprise security layer 20 but also within the security layer 24 of the financial expert.

An advantage of embedding the financial data processing unit 22 of the financial expert within the company is that it allows the processing of vast amounts of financial data within the secured environment of the enterprise without having to export the vast amounts of raw financial data. Thus, the financial data can reside within the enterprise security area 20 without unnecessarily exposing the data to unauthorized third parties. Further, the financial data processing unit 22 can perform suitable data analysis within the company by accessing the collated raw data in the financial data storage unit 18 rather than interfacing with each ERP system 14a-14n individually.

Further, since the financial data processing unit 22 is resident behind or encapsulated in the security layer 24 of the financial expert but within the native environment of the company, the financial expert can prevent the company from accessing the processed financial data within the data processing unit 28 as well as the software applications employed by the financial data processing unit 22.

The financial data processing unit 22 can be constructed from a selected set of dedicated processing nodes that are separate from the processing nodes of the company. The overall security schema for the security layer 24 is created to encapsulate the raw data storage unit 26, the data processing unit 28, the reporting unit 30, and the database 32. The financial data processing unit 22 can also create via suitable software a replica audit table structure based on the source data structure with associated storage allocation. The audit table structure can be created in the financial data processing unit 22 via data definition language commands appropriate for the underlying storage technology (e.g., if SQL based then use Create Table <table name>{col1 int, col2 char, . . . }), and the like. Further, the security layer 24 also secures the replica audit tables and the processing nodes. The audit tables are formed by scripts that are executed on the raw data that is stored in the raw data storage unit 26. The security layer 24 surrounding the financial data processing unit 22 can be implemented by suitable hardware and software stored in the financial data processing unit 22.

Figure 2:
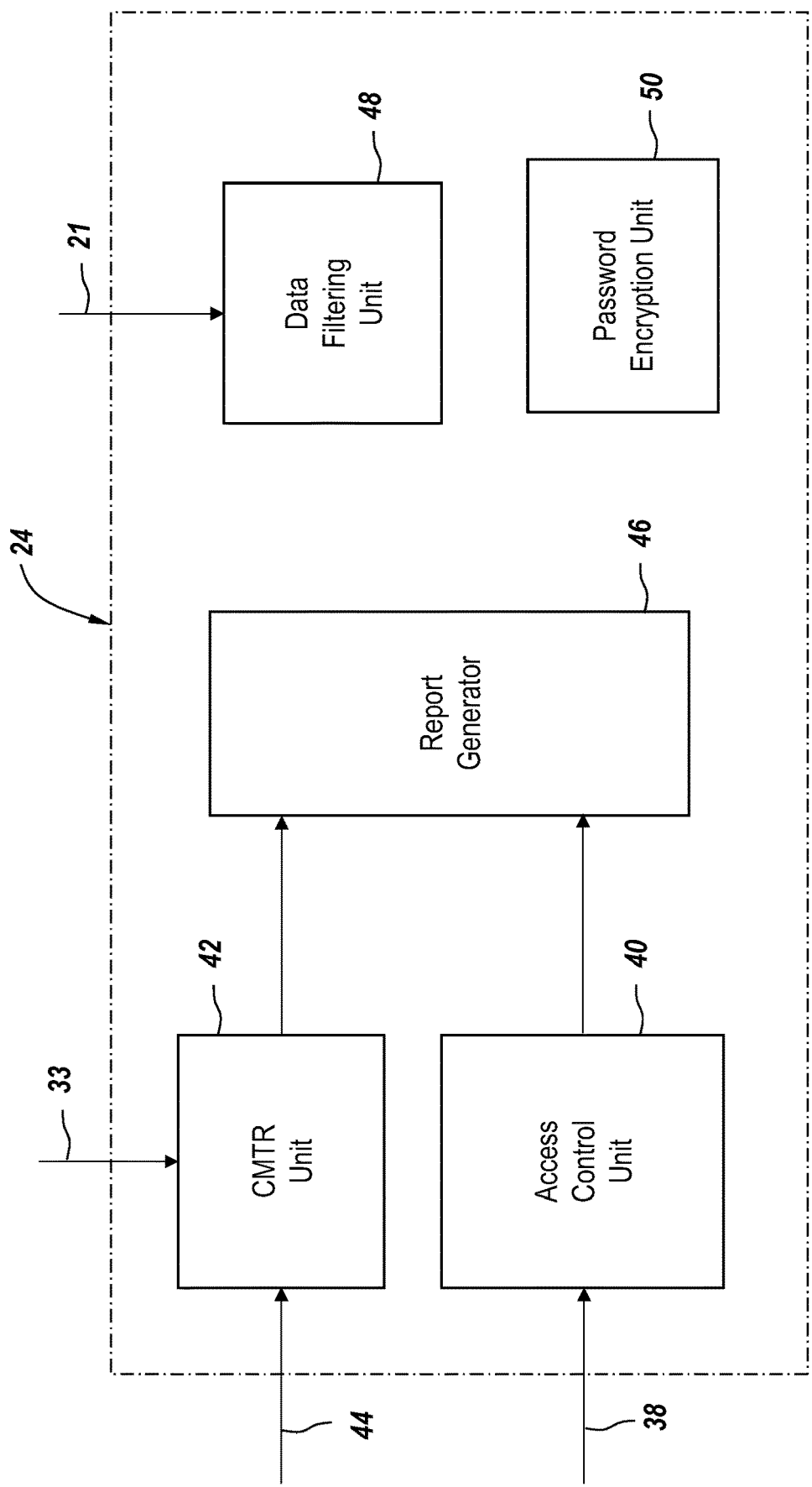
FIG. 2 is a more detailed schematic representation of the security layer of the data collection and processing system of FIG. 1 according to the teachings of the present invention.

As shown in FIG. 2, the security layer 24 can include an access control unit 40 that can be configured to allow selected access to the financial data processing unit 22 and to monitor the access by one more nodes or system components of the company or by one or more selected personnel of the company and the financial expert through a communication channel 38. By way of example, access to the financial data processing unit 22 can be monitored and restricted via the access control unit 40 only to a defined number of administrators of the company and personnel of the financial expert. Further, the access control unit can serve to trace records or data that are stored within the financial data processing unit 22, such as for example the data processing unit 28. With regard to the security layer 24, a selected encryption technique can be employed. The encryption technique can include employing a connection monitoring trace recorder (CMTR) unit 42 to monitor and record system connections 44 to the financial data processing unit 22 that is controlled and monitored only by the financial expert via the communication channel 33. Further, the security layer 24 can monitor and trace records that are stored in the financial data processing unit 22. The (CMTR) unit 42 can also remove tracing for all other non-financial expert users. The security layer can also include a report generator 46 for generating one or more reports regarding the specific users of the financial data processing unit 22 and that can be used for access monitoring review by the financial expert.

The security layer 24 can also include a data filtering unit 48 for filtering the financial data 21 that is replicated from the financial data storage unit 18 as part of an overall financial data replication technique or mechanism. The filtering unit 48 can filter and test the data replication mechanism for the financial data as it is transferred from the financial data storage unit 18 to the financial data processing unit 22 via the security layer 24. The filtering unit 48 can be configured by the financial expert to filter data based on one or more selected system parameters, including for example a selected time period, company information, specific types of financial reports to be generated, type of financial data including types of tables, and the like. If required, the security layer can establish a separate storage unit, such as a relational database and associated online analytical processing (OLAP) engine, for all accounts which are controlled by the financial expert. The data, such as data tables, can be encrypted within the database. The security layer can also include a password encryption unit 50 that can apply password encryption to the financial data files. The database and associated OLAP engine can also be implemented as part of the data processing unit 28, the reporting unit 30, and/or the storage unit 32.

The data processing unit 28 of the financial data processing unit 22 can also employ a series of analysis tools or applications, such as tax and audit tools, for processing the financial data. The tools can be encrypted and compiled and can be added to a software container. The software container is a standard unit of software that provides a standard way to package application code, dependencies, libraries, and configurations into a single package or run-time environment to ensure that the application can run quickly and reliably regardless of operating environment. Thus, containerized software can always run the same, regardless of the underlying infrastructure, hence serve to isolate the software from the operating environment.

The financial expert can also confirm that the suitable security restrictions and controls have been implemented in the security layer 24. For example, the access control unit 40 of the security layer 24 can determine and control the specific users of the financial data processing unit 22. For example, the access control unit can control access to only personnel of the financial expert. Further, the CMTR unit 42 is activated so as to monitor the connections 44 to the financial data processing unit 22.

The present invention also includes ensuring that the financial application (e.g., audit application) associated with or stored in the data processing unit 28 is installed, encrypted, compiled and containerized consistent with the requirements of the security layer 24, as well as the requirements of the secured area 20 of the company. For example, the computer 36A or multiple computers can store, process or package the financial application along with associated libraries in the container (program development), which is then encrypted and transferred via the computer 36B to the computers 34 assigned to the financial expert at the company. The computers 34 have access to the financial data processing unit 22.

The data filtering unit 48 of the security layer 24 defines the parameters for the processing of the financial data. The data filtering unit 48 in connection with the replication of the data from the financial data storage unit 18 helps define the scope of the transfer of the raw financial data to the raw data storage unit 26 through the security layer 24. Using the data filtering unit and the replication technique, the raw financial data from the financial data storage unit 18 is transferred to the raw data storage unit 26 of the financial data processing unit 22. The raw financial data can be stored in raw data tables consistent with the common data model, which can include a series of tables therein for storing the raw financial data. The raw data tables are the structure that store elements of the financial data in a structured way (e.g., columns and rows). The financial data contained in the raw data tables usually follows a normalized form structure (e.g., the Boyce-Codd normal form), which organizes the data elements in a disaggregated way so they can be queried and recombined in virtually unlimited ways for reporting. The data processing unit 28 can also include one or more financial or audit software tools or applications for processing the raw financial data in the raw data tables so as to produce processed financial data (e.g., results data). The processed financial data can be transferred or mapped to data tables in the reporting unit 30 so as to create the financial reports. The reporting unit 32 and/or the report storage unit 32 can include a database of any type, such as a relational database, that employs an OLAP engine to process the data tables in the reporting unit 32. The computers 34 can control or instruct the financial data processing unit 22 to connect or import the financial reports to predetermined files, including Microsoft Office files. The password encryption unit 50 of the security layer 24 can execute a suitable password encryption application to generate a random password and apply the random password to the exported financial reports, which can include financial tables.

The financial expert via the computers 34 can access the exported financial reports. The financial expert can access the reports with the previously assigned password, thus ensuring the security of the information. The financial expert can analyze the financial reports, and can further export the financial reports via secured communication pathways to the computers 36 that are under the control of the financial expert. Once the review of the financial reports is complete, the reports and associated data, as well as the embedded system and software can be deleted after a selected period of time from the computers 34, 36 as well as from the financial data processing unit 22 and from the security layer 24.

Figure 3A:
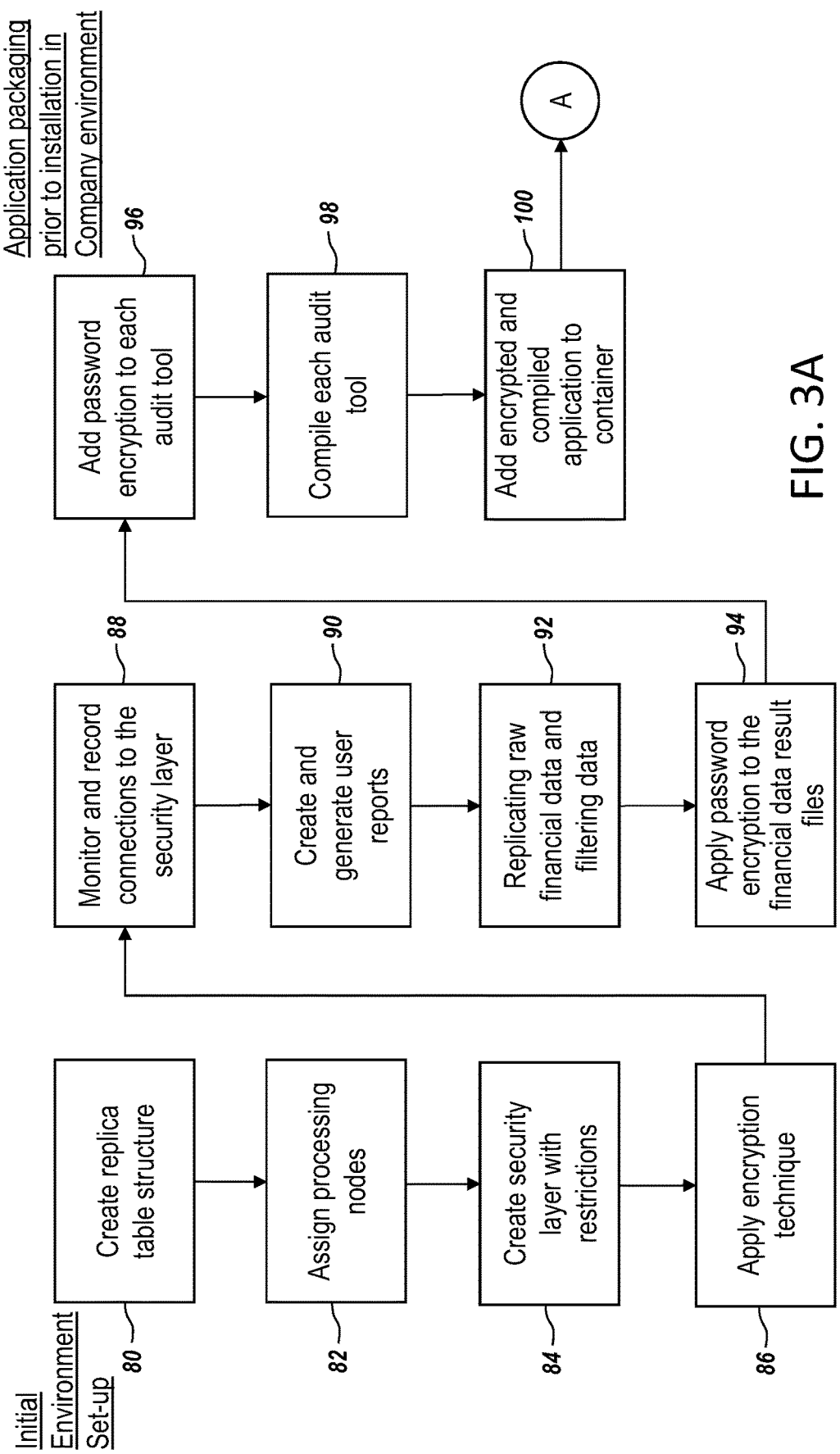
FIGS. 3A, 3B, and 3C are schematic flow chart diagrams of the creation and operation of the security layer and the financial data processing unit of FIGS. 1 and 2 according to the teachings of the present invention.

In operation, the financial expert can initially set up or establish the financial data processing unit 22 and security layer (or schema) 24 in the electronic data collection and processing system 10. As shown in FIG. 3A, the replica raw data table structure in the raw data storage unit 26 and the associated storage structure can be created based on the raw financial data structure, step 80. The financial data processing unit 22 and the security layer 24 are implemented by a series of company processing nodes within the secured area 20 that are assigned to the financial expert, step 82. The processing nodes are separate from the client production processing nodes. The financial expert then creates the overall security schema or layer 24 to encapsulate the replica audit tables and processing nodes. Access to the security layer 24 and associated financial data processing unit 22 containing the financial tables and processing nodes is restricted by the access control unit 40 only to selected personnel of the company and to personnel of the financial expert, step 84. A selected encryption technique is applied to the security layer, step 86. The CMTR unit 42 can record connections to the encrypted security layer 24 and is controlled only by the financial expert, step 88. The CMTR unit can also trace records to the encrypted tables in the financial data processing unit 22. The report generator 46 can also create and generate user reports for the encrypted security layer 24 for subsequent review by the personnel of the financial expert, step 90. The personnel can review the user reports to monitor, determine and/or restrict access to the financial data processing unit 22.

The personnel of the financial expert can also create and test data replication mechanisms or techniques for replicating the raw financial data from the financial data storage unit 18 to the raw data storage unit 26. The security layer 24 can also include a data filtering unit 48 for filtering the data according to selected parameters associated with, for example, an audit being performed by the financial expert. The parameters can be related to the audit type and scope and include, for example, the time period the data is being analyzed, the scope of the audit on the company, and relevant data elements and tables underlying the systems and business processes of the company, step 92.

If required, the financial expert as part of the financial data processing unit 22 can set up a relational database and associated OLAP engine and require database authentication for all accounts which are controlled by the financial expert. The personnel of the financial expert can encrypt the tables within the database as well as any audit logic within the database programmatic units (e.g., stored procedures, functions, triggers, and the like). Also, the personnel can create a script to apply password encryption to the financial data result files, which are usually in Microsoft Office files, step 94.

Prior to installing any application software as part of the financial data processing unit 22 in the company environment, the personnel of the financial expert can add password encryption to each financial application or tool, such as an audit tool, step 96. The personnel can then compile each audit tool such that the source code is not human readable, step 98. The encrypted and compiled application (e.g., audit tool) is then added to a software container along with all dependent libraries and runtime environment files for deployment to the financial data processing unit 22, step 100.

Figure 3B:
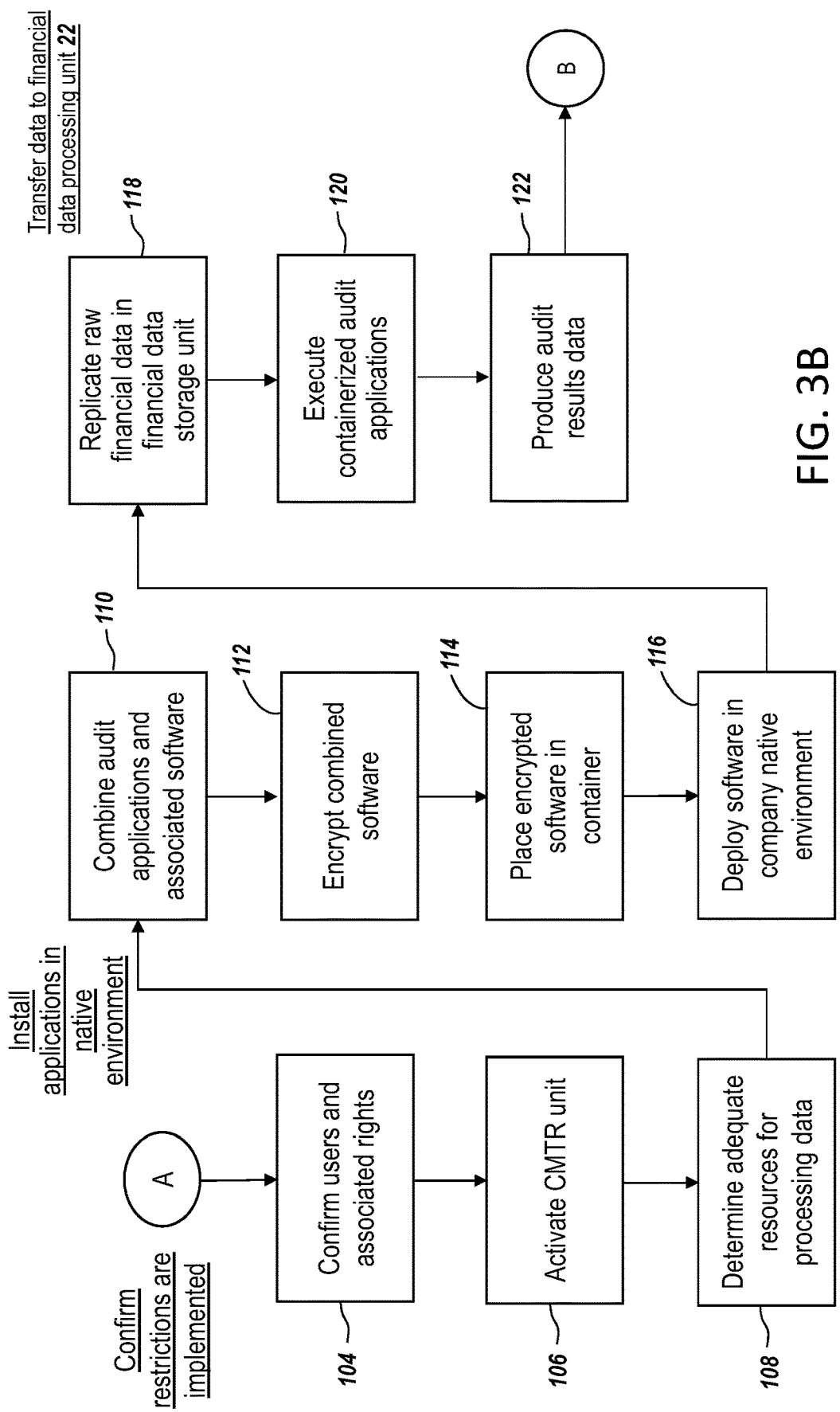

As shown in FIG. 3B, the personnel of the financial expert confirms that all restrictions and controls are implemented. The personnel review and confirm the users of the financial data processing unit 22 and the associated rights of the users, step 104. For example, the personnel can confirm that only financial expert personnel (e.g., third party side) can access the financial data processing unit 22 and the security layer 24 at this time. The personnel of the company (e.g., client side) are restricted so as to have predetermined and limited access as determined by the financial expert. Further, the CMTR unit 42 is activated, step 106. The personnel of the financial expert can then ensure that adequate resources exist for the processing of the financial data, step 108. Specifically, the personnel can determine that the data size allocation for the encrypted security layer 24 is sufficient for data to be analyzed based on audit scope, and ensure that the processing node allocation is enough to process the amount of financial data that forms part of the audit scope.

The personnel of the financial expert then deploy software applications in the native environment of the company, and specifically within the secured area 20. The application deployment occurs by employing electronic devices that are external to the company, such as for example by using one or more of the computers 36. The illustrated computer 36a can be used to package together in a software container the audit applications or tools along with associated dependent libraries, step 110. The combined software is then encrypted, step 112, and then placed in the container or encrypted within the container, step 114. The container is then deployed via the computers 36 and 34 and stored in the native environment of the company, step 116. Specifically, the container is transferred to the financial data processing unit 22, and is preferably stored in the data processing unit 28.

The raw financial data that is aggregated, collected and stored in the financial data storage unit 18 is then replicated and transferred to the financial data processing unit 22 via the security layer 24, and specifically via the data filtering unit 48. That is, the raw data can be stored in the financial data storage unit 18 in production tables, is replicated, filtered by the security layer 24, and then eventually stored in the raw data storage unit 26, step 118. That is, the raw financial data stored in the production tables of the raw financial data is transferred to the security layer 24 and the financial data processing unit 22 via the data processing unit 28, which executes the encrypted, compiled and containerized audit applications therein to produce encrypted audit results files containing the processed financial data, step 120. Specifically, using the defined audit scope (e.g., timeframe analyzed, audit procedure relevant data elements, client organizational entities, etc.) via the data filtering unit and the data replication mechanism created in prior steps, the replicated raw data is transferred to the encrypted raw data tables of the raw data storage unit 26. The encrypted audit application is then executed and the raw data in the raw data tables is processed by the data processing unit 28 to produce audit results data that is stored therein and/or in the reporting unit 30 and/or the database 32. On or more of these units can employ a relational database and processed with an associated OLAP engine to produce OLAP data tables, step 122. The audit results data is then connected with one or more other application, such as with Microsoft Office files, to form reporting tables. The security layer 24 can then execute the password application program stored in the password encryption unit 50 to generate a random password and then apply the password to the output audit results files.

Figure 3C:
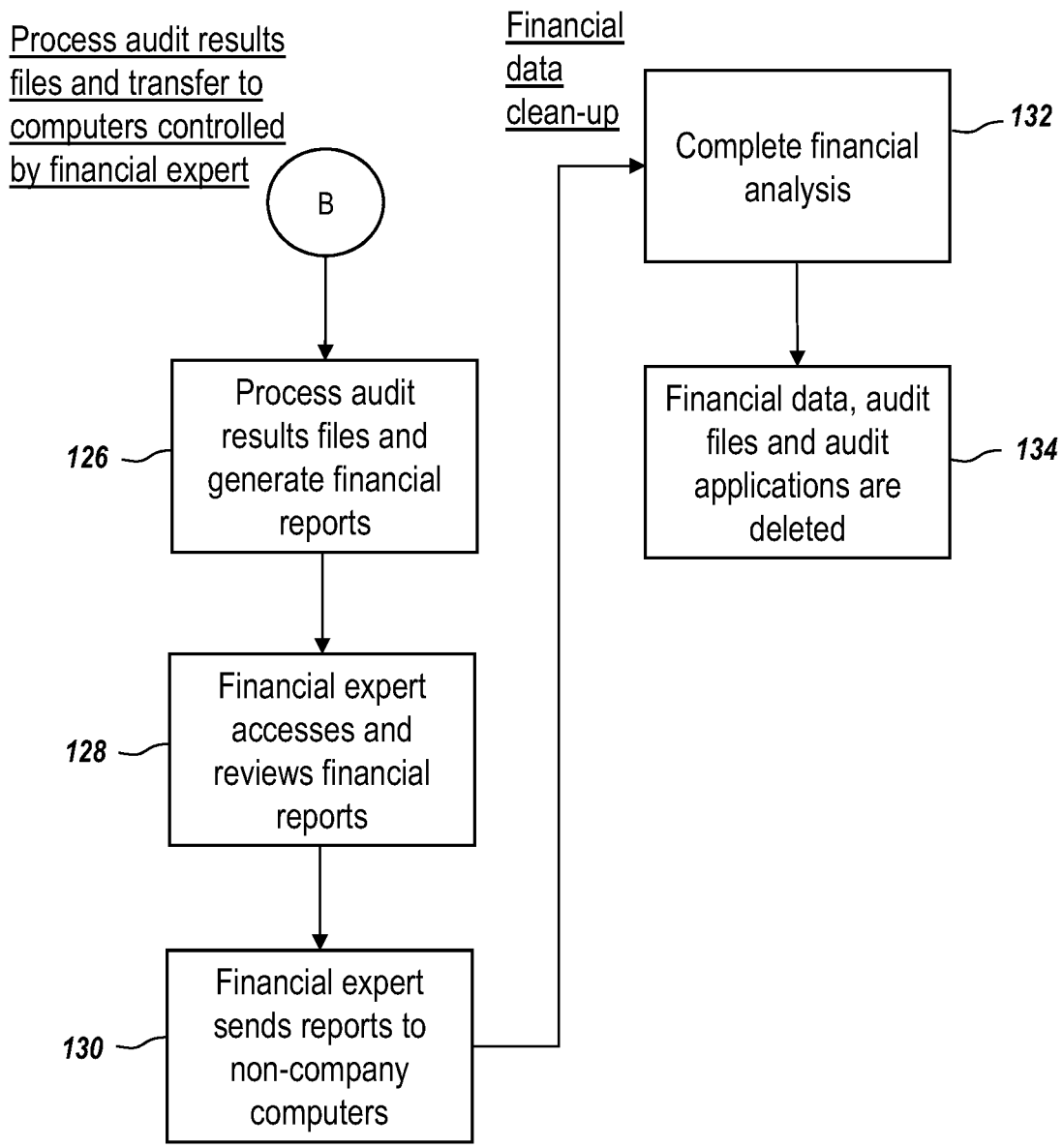

The audit results files are then processed by the financial data processing unit 22 to form financial reports and then the reports are transferred to computers controlled by the financial expert. As shown in FIG. 3C, the audit results files are processed by the reporting unit 30 to create or generate the financial reports, step 126. The financial reports are then stored in the database 32, and then transferred 33 to the computers 34. The computers are external to the security area 20 and the security layer 24, and are controlled by the financial expert notwithstanding being located at the company. The computers, since being located at the company, can connect to the financial data processing unit 22 and allows the financial expert to access the financial reports, step 128. The financial expert can access the financial reports and associated audit files results data by providing the assigned random password. The personnel of the financial expert can then analyze the financial reports. Once completed, the financial reports can then be transferred to the computers 36 of the financial expert and hence external to the company, step 130.

Once the financial analysis (e.g., audit) is completed by the financial expert, the financial data and associated reports need to be addressed, step 132. According to one practice, once the audit is concluded, the financial expert can delete all data files, results files and audit applications from the security layer 24 and the financial data processing unit 22, step 134.

In the current system 10, the company typically does not wish to corrupt production data, negatively impact daily production transactional or batch processing, or expose the financial data to third parties or network connections outside of the client. The security layer 24 helps prevent the company from utilizing the financial data processing unit 22 to perform auditing activities without the knowledge of the financial expert. Further, the security layer helps prevent the company from reverse engineering the system while concomitantly maintaining the integrity of the audit procedures, or making unwanted changes to the financial data processing unit 22.

It should be appreciated that various concepts introduced above and discussed in greater detail below may be implemented in any number of ways, as the disclosed concepts are not limited to any particular manner of implementation or system configuration. Examples of specific implementations and applications are provided below primarily for illustrative purposes and for providing or describing the operating environment of the system of the present invention. The system 10 of the present invention can employ a plurality of electronic devices, such as one or more servers, clients, computers and the like, that are networked together or which are arranged so as to effectively communicate with each other. The network can be any type or form of network. The devices can be on the same network or on different networks. In some embodiments, the network system may include multiple, logically-grouped servers. In one of these embodiments, the logical group of servers may be referred to as a server farm or a machine farm. In another of these embodiments, the servers may be geographically dispersed. The devices can communicate through wired connections or through wireless connections. The clients can also be generally referred to as local machines, clients, client nodes, client machines, client computers, client devices, endpoints, or endpoint nodes. The servers can also be referred to herein as servers, nodes, or remote machines. In some embodiments, a client has the capacity to function as both a client or client node seeking access to resources provided by a server or node and as a server providing access to hosted resources for other clients. The clients can be any suitable electronic or computing device, including for example, a computer, a server, a smartphone, a smart electronic pad, a portable computer, and the like, such as the electronic device 300. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients. The system 10, the financial data processing unit 22, and/or the security layer 24 of the present invention can be stored on one or more of the clients, servers, and the hardware associated with the client or server, such as the processor or CPU and memory described below.

Figure 4:
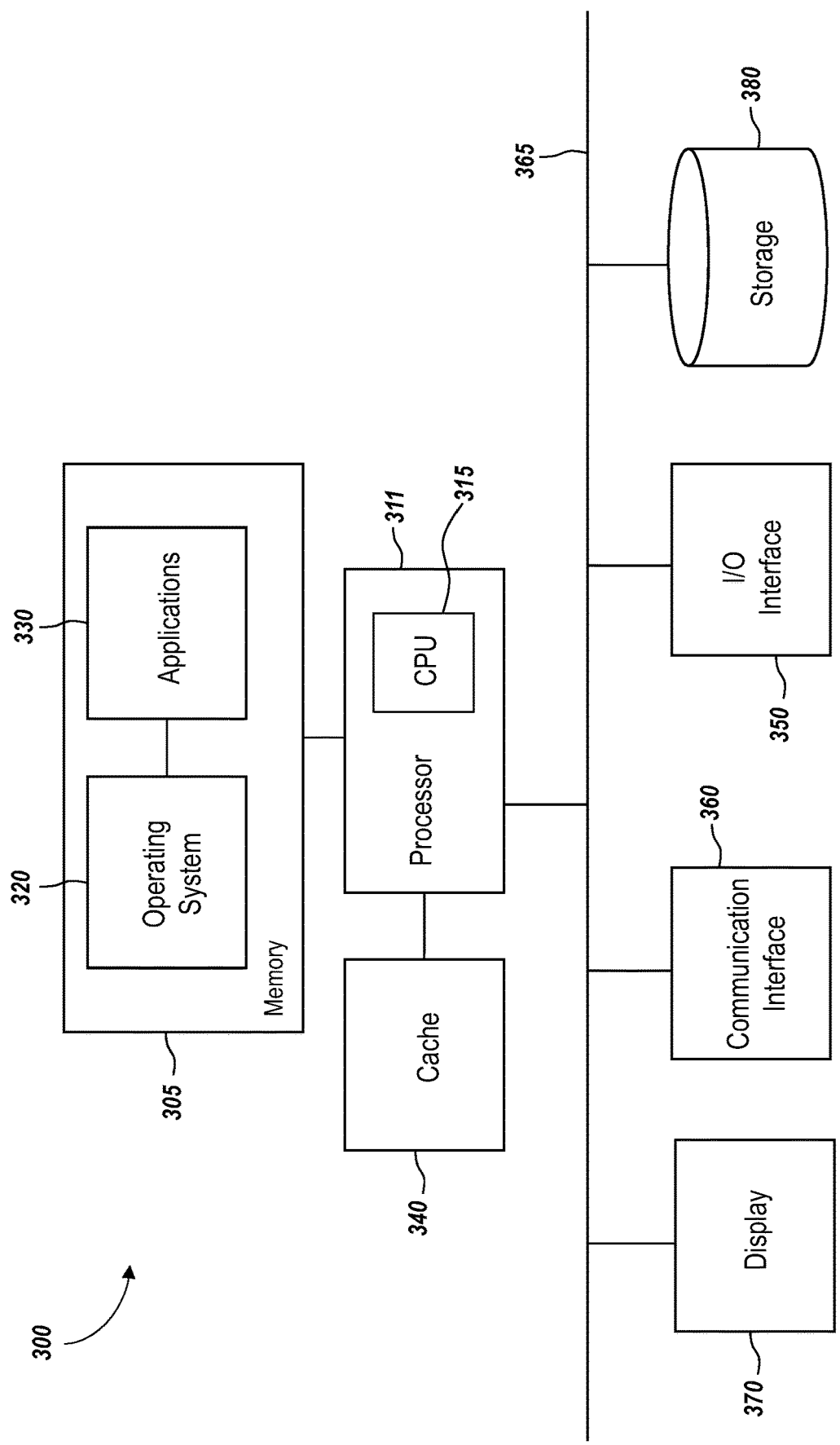
FIG. 4 is a schematic diagram of an electronic device suitable for implementing any component of the electronic data collection and processing system of the present invention.

FIG. 4 is a high-level block diagram of an electronic device 300 that can be used with the embodiments disclosed herein. Without limitation, the hardware, software, and techniques described herein in connection any component, unit, or module of the electronic data collection and processing system 10, including the financial data processing unit 22 (e.g., the raw data storage unit 26, the data processing unit 28, the reporting unit 30 and the storage unit 32) and the security layer 24, can be implemented in digital electronic circuitry such as computer hardware that executes firmware, software, or combinations thereof. The implementation can be as a computer program product (e.g., a non-transitory computer program tangibly embodied in a machine-readable storage device, for execution by, or to control the operation of, one or more data processing apparatuses, such as a programmable processor, one or more computers, one or more servers and the like).

The illustrated electronic device 300 can be any suitable electronic circuitry that includes a main memory unit 305 that is connected to a processor 311 having a CPU 315 and a cache unit 340 configured to store copies of the data from the most frequently used main memory 305.

Further, the methods and procedures for carrying out the methods disclosed herein can be performed by one or more programmable processors executing a computer program to perform functions of the invention by operating on input data and generating output. Further, the methods and procedures disclosed herein can also be performed by, and the apparatus disclosed herein can be implemented as, special purpose logic circuitry, such as a FPGA (field programmable gate array) or an ASIC (application specific integrated circuit). Modules and units disclosed herein can also refer to portions of the computer program and/or the processor/special circuitry that implements that functionality.

The processor 311 is any logic circuitry that responds to, processes or manipulates instructions received from the main memory unit, and can be any suitable processor for execution of a computer program. For example, the processor 311 can be a general and/or special purpose microprocessor and/or a processor of a digital computer. The CPU 315 can be any suitable processing unit known in the art. For example, the CPU 315 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor. Generally, the processor 311 can be embodied in any suitable manner. For example, the processor 311 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 311 can be configured to execute instructions stored in the memory 305 or otherwise accessible to the processor 311. As such, whether configured by hardware or software methods, or by a combination thereof, the processor 311 can represent an entity (e.g., physically embodied in circuitry) capable of performing operations according to embodiments disclosed herein while configured accordingly. Thus, for example, when the processor 311 is embodied as an ASIC, FPGA or the like, the processor 311 can be specifically configured hardware for conducting the operations described herein. Alternatively, as another example, when the processor 311 is embodied as an executor of software instructions, the instructions can specifically configure the processor 311 to perform the operations described herein. In many embodiments, the central processing unit 530 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The processor can be configured to receive and execute instructions received from the main memory 305.

The electronic device 300 applicable to the hardware of the present invention can be based on any of these processors, or any other processor capable of operating as described herein. The central processing unit 315 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

The processor 311 and the CPU 315 can be configured to receive instructions and data from the main memory 305 (e.g., a read-only memory or a random access memory or both) and execute the instructions. The instructions and other data can be stored in the main memory 305. The processor 311 and the main memory 305 can be included in or supplemented by special purpose logic circuitry. The main memory unit 305 can include one or more memory chips capable of storing data and allowing any storage location to be directly accessed by the processor 311. The main memory unit 305 may be volatile and faster than other memory in the electronic device, or can dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 305 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 305 can be based on any of the above described memory chips, or any other available memory chips capable of operating as described herein. In the embodiment shown in FIG. 4, the processor 311 communicates with main memory 305 via a system bus 365. The computer executable instructions of the present invention may be provided using any computer-readable media that is accessible by the computing or electronic device 300. Computer-readable media may include, for example, the computer memory or storage unit 305. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 305 is shown within the computing device 300 it will be appreciated that the storage may be distributed or located remotely and accessed via a network or other communication link.

The main memory 305 can comprise an operating system 320 that is configured to implement various operating system functions. For example, the operating system 320 can be responsible for controlling access to various devices, memory management, and/or implementing various functions of the asset management system disclosed herein. Generally, the operating system 320 can be any suitable system software that can manage computer hardware and software resources and provide common services for computer programs.

The main memory 305 can also hold application software 330. For example, the main memory 305 and application software 330 can include various computer executable instructions, application software, and data structures, such as computer executable instructions and data structures that implement various aspects of the embodiments described herein. For example, the main memory 305 and application software 330 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers). Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

The processor 311 can further be coupled to a database or data storage 380. The data storage 380 can be configured to store information and data relating to various functions and operations of the content characterization systems disclosed herein. For example, as detailed above, the data storage 380 can store information including but not limited to captured information, multimedia, processed information, and characterized content.

A wide variety of I/O devices may be present in or connected to the electronic device 300. For example, the device can include a display 370. The display 370 can be configured to display information and instructions received from the processor 311. Further, the display 370 can generally be any suitable display available in the art, for example a Liquid Crystal Display (LCD), a light emitting diode (LED) display, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays, or electronic papers (e-ink) displays. Furthermore, the display 370 can be a smart and/or touch sensitive display that can receive instructions from a user and forwarded the received information to the processor 311. The input devices can also include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. The output devices can also include video displays, graphical displays, speakers, headphones, inkjet printers, laser printers, and 3D printers.

The electronic device 300 can also include an Input/Output (I/O) interface 350 that is configured to connect the processor 311 to various interfaces via an input/output (I/O) device interface 380. The device 300 can also include a communications interface 360 that is responsible for providing the circuitry 300 with a connection to a communications network (e.g., communications network 120). Transmission and reception of data and instructions can occur over the communications network.

The invention claimed is:

1. A third party data processing system for processing and analyzing financial data of an enterprise, wherein the data processing system is contained and secured within a native environment of the enterprise, comprising
   a financial data processing unit of a third party for processing and analyzing the financial data from one or more data sources of the enterprise and located in the native environment of the enterprise, wherein the financial data processing unit comprises a financial data processing unit processor and memory including computer program code, wherein the computer program code of the financial data processing unit, when executed, is configured to cause the financial data processing unit processor to:
      receive and store raw financial data from the one or more data sources,
      process the raw financial data and generate processed financial data, and
      create one or more financial reports from the processed financial data, and
   a third party security layer for securing via an encryption technique the financial data processing unit within the native environment of the enterprise so as to restrict access thereto to the third party, thereby preventing access to the processed financial data by the enterprise, wherein the third party security layer comprises a third party security layer processor and memory including computer program code, wherein the computer program code of the third party security layer, when executed, is configured to cause the third party security layer processor to:
      filter the raw financial data prior to receipt of the raw financial data,
      control access along a communication channel to the financial data processing unit and trace data stored within the financial data processing unit, and
      monitor and record connections to the financial data processing unit via the third party security layer, wherein the monitoring and recording of connections is controlled and monitored only by the third party via one or more communication channels, and
   an enterprise security layer, wherein the enterprise security layer comprises an enterprise security layer processor and memory including computer program code, wherein the computer program code of the enterprise security layer, when executed, is configured to cause the enterprise security layer processor to secure the financial data of the enterprise and of the one or more data sources such that the financial data processing unit and the third party security layer are secured by the enterprise security layer,
   wherein the financial data processing unit and the third party security layer are embedded in the native environment of the enterprise and within the enterprise security layer, wherein the financial data processing unit and the third party security layer are formed from a plurality of dedicated processing nodes separate and distinct from a plurality of nodes of the enterprise, and wherein the financial data processing unit is encapsulated in the third party security layer.

2. The data processing system of claim 1, wherein the raw financial data can be replicated from the one or more data sources, and wherein the one or more data sources comprises one or more enterprise resource planning systems or one or more financial data storage units.

3. The data processing system of claim 1, further comprising
   one or more enterprise electronic devices disposed within the native environment of the enterprise and in communication with the financial data processing unit, wherein the enterprise electronic devices limit access to the one or more financial reports generated by the financial data processing unit to a selected number of enterprise personnel and a selected number of third party personnel, and
   one or more third party electronic devices located external to the native environment of the enterprise and communicating with the one or more enterprise electronic devices.

4. The data processing system of claim 1, wherein the third party security layer further comprises
   a report generator for generating a report for users of the financial data processing unit, and
   a password encryption unit for encrypting the processed financial data of the financial data processing unit.

5. The data processing system of claim 1, wherein the financial data processing unit further comprises a storage unit for storing the one or more financial reports.

6. The data processing system of claim 5, wherein the financial data processing unit is configured to create a replica audit table structure based on a data structure of the source data with associated storage allocation by employing data definition language commands.

7. The data processing system of claim 1, wherein the financial data processing unit comprises one or more audit applications for processing the raw financial data, and wherein the one or more audit applications are stored in a software container, and
   wherein the one or more audit applications are stored therein in compiled executable binary files.

8. The data processing system of claim 1, wherein the third party security layer defines one or more parameters for processing of the raw financial data.

9. The data processing system of claim 1, wherein the raw financial data is stored in raw data tables, and wherein the financial data processing unit processes the raw financial data in the raw data tables and stores the processed financial data in an audit data structure.

10. The data processing system of claim 9, wherein the raw data tables have a normalized structure for organizing data elements in a disaggregated way.

11. The data processing system of claim 1, wherein the processed financial data is mapped to one or more data tables so as to create the one or more financial reports.

12. The data processing system of claim 1, wherein the third party security layer comprises a connection monitoring trace recorder unit, wherein the connection monitoring trace recorder unit comprises a connection monitoring trace recorder unit processor and memory including computer program code, wherein the computer program code of the connection monitoring trace recorder unit, when executed, is configured to cause the connection monitoring trace recorder unit processor to monitor and record connections to the financial data processing unit via the third party security layer.

13. The data processing system of claim 12, wherein the computer program code of the connection monitoring trace recorder unit, when executed, is configured to cause the connection monitoring trace recorder unit processor to trace records to encrypted tables in the financial data processing unit.

14. The data processing system of claim 13, wherein the computer program code of the connection monitoring trace recorder unit, when executed, is configured to cause the connection monitoring trace recorder unit processor to remove tracing for non-financial expert users.

15. The data processing system of claim 12, wherein the third party security layer comprises an access control unit, wherein the access control unit comprises an access control unit processor and memory including computer program code, wherein the computer program code of the access control unit processor, when executed, is configured to cause the access control unit processor to control access along the communication channel to the financial data processing unit and trace the data stored within the financial data processing unit.

16. The data processing system of claim 15, wherein the computer program code of the access control unit processor, when executed, is configured to determine and control specific users having access to the financial data processing unit.

17. A computer implemented method for processing and analyzing financial data with a data processing system, wherein the data processing system is contained and secured within a native environment of an enterprise, comprising
embedding a financial data processing unit of a third party in the native environment of the enterprise,
receiving and storing raw financial data from one or more data sources of the enterprise in the financial data processing unit,
processing the raw financial data and generating processed financial data with the financial data processing unit,
creating one or more financial reports from the processed financial data with the financial data processing unit,
securing via a third party security layer the financial data processing unit in the native environment of the enterprise via an encryption technique so as to restrict access thereto to the third party, thereby preventing access to the processed financial data by the enterprise,
filtering the raw financial data prior to receipt of the raw financial data by the financial data processing unit,
controlling access along a communication channel to the financial data processing unit and tracing data stored within the financial data processing unit,
monitoring and recording connections to the financial data processing unit via a connection monitoring trace recorder (CMTR) unit of the third party security layer, wherein the CMTR unit is controlled and monitored only by the third party via one or more communication channels, and
providing an enterprise security layer for securing the financial data of the enterprise and of the one or more data sources such that the financial data processing unit and the third party security layer are secured by the enterprise security layer,
wherein the financial data processing unit and the third party security layer are embedded in the native environment of the enterprise and within the enterprise security layer, and wherein the financial data processing unit is encapsulated in the third party security layer.

18. The computer implemented method of claim 17, further comprising employing the encryption technique for securing the financial data processing unit, for limiting communication with the financial data processing unit, and for monitoring and controlling flow of financial data to and from the financial data processing unit.

19. The computer implemented method of claim 17, further comprising forming the financial data processing unit from a plurality of dedicated processing nodes separate and distinct from a plurality of nodes of the enterprise.

20. The computer implemented method of claim 17, further comprising replicating the raw financial data from the one or more data sources of the enterprise, wherein the one or more data sources comprises one or more enterprise resource planning systems or one or more financial data storage units.

21. The computer implemented method of claim 17, further comprising
generating a report of users of the financial data processing unit, and
password encrypting the processed financial data of the data processing unit.

22. The computer implemented method of claim 17, further comprising
processing the raw financial data with one or more audit applications, and
storing the one or more audit applications in a software container in compiled executable binary files.

23. The computer implemented method of claim 17, wherein the step of filtering further comprises defining one or more parameters associated with the processing of the raw financial data.

24. The computer implemented method of claim 17, further comprising
storing the raw financial data in a raw data storage unit in raw data tables, and
processing the raw financial data in the raw data tables and then storing the processed financial data in an audit data structure.

25. The computer implemented method of claim 24, wherein the raw data tables have a normalized structure for organizing data elements in a disaggregated way.

26. The computer implemented method of claim 24, further comprising mapping the processed financial data to one or more data tables in the reporting unit so as to create the one or more financial reports.

27. The computer implemented method of claim 17, further comprising encapsulating the financial data processing unit with the third party security layer, and restricting access to the financial data processing unit with the third party security layer.

28. The computer implemented method of claim 17, wherein the step of monitoring further comprises the step of recording access to the financial data processing unit.

29. The computer implemented method of claim 28, further comprising tracing financial data to data tables in the financial data processing unit.

30. The computer implemented method of claim 17, further comprising applying a password encryption technique to the processed financial data.

31. The computer implemented method of claim 17, further comprising
- employing one or more electronic devices of the enterprise to access the one or more financial reports, and
- via the third party, controlling access by to the electronic devices.

32. The computer implemented method of claim 31, further comprising transmitting the one or more financial reports from the electronic devices of the enterprise to one or more electronic devices of the third party.

33. The computer implemented method of claim 32, further comprising deleting the one or more financial reports and associated files in the financial data processing unit.

* * * * *